United States Patent [19]

Ashida et al.

[11] 3,931,065

[45] Jan. 6, 1976

[54] POLYURETHANE-MODIFIED POLYISOCYANURATE FOAM AND A METHOD FOR THE PREPARATION THEREOF

[75] Inventors: Kaneyoshi Ashida; Takao Yagi, both of Tokyo, Japan

[73] Assignee: Nisshin Boseki Kabushiki Kaisha, Japan

[22] Filed: Feb. 13, 1967

[21] Appl. No.: 615,395

[30] Foreign Application Priority Data
Feb. 18, 1966 Japan.................................. 41-9401
Dec. 27, 1966 Japan.............................. 41-84772
Dec. 30, 1966 Japan.................................. 42-128

[52] U.S. Cl. ....................... 260/2.5 AW; 260/2.5 AJ; 260/2.5 AT; 260/77.5 NC
[51] Int. Cl.² .......................................... C08G 18/14
[58] Field of Search .. 260/2.5 AC, 2.5 AW, 2.5 AT, 260/77.5 IS, 2.5 A, 2.5 AJ, 77.5 NC

[56] References Cited
UNITED STATES PATENTS
3,179,626  4/1965  Beitchmann...................... 260/77.5
3,206,352  9/1965  Collis et al............................ 161/93
3,211,704  10/1965  Gilman et al. ..................... 260/77.5
3,252,942  5/1966  France et al....................... 260/77.5
3,516,950  6/1970  Haggis............................ 260/859 R FOREIGN PATENTS OR APPLICATIONS
908,337  10/1962  United Kingdom ......... 260/77.5 NC

*Primary Examiner*—M. J. Welsh
*Attorney, Agent, or Firm*—Robert E. Burns; Emmanuel J. Lobato; Bruce L. Adams

[57] ABSTRACT

This invention relates to polyurethane-modified polyisocyanurate foam having excellent flame-resistivity and non-combustibility, which is prepared from (A) at least one aromatic polyisocyanates having no ortho-substituent, (B) at least one polyhydroxyl and/or polycarboxyl compound, (C) at least one foaming agent and (D) at least one catalyst used for the trimerization of isocyanate groups. The proportions of these components satisfy the relationships: (1) the equivalent ratio, $Ae/(Be+Ce+De)$, is more than two, and (2) the weight ratio, $Bw/Aw$ is less than 0.4 and more than zero, wherein A, B, C and D represent the above mentioned components respectively, e represents the number of chemical equivalents, w represents the weight of the components and the factors and $Ce$ and $De$ are eliminated from the relationships when components C and D do not react with the component A.

5 Claims, No Drawings

POLYURETHANE-MODIFIED POLYISOCYANURATE FOAM AND A METHOD FOR THE PREPARATION THEREOF

This invention relates to the preparation of a high flame-resistant rigid plastic foam.

Heretofore known rigid urethane foams defined as "non-burning grade" by ASTM D 1692 – 59T are essentially flammable in actual use, and have low flame resistivity; for example, the flame penetration test by the Bureau of Mines (U.S.A.) shows only 1 to 2 minutes of burn through time. On the other hand, isocyanurate-containing polyurethane foam with improved high temperature properties has been described by Nicholas and Gmitter : J. Cellular Plastics, Vol. 1, No. 1, page 85 (1965), and J. Burkus's patents, U.S. Pat. Nos. 2,979,485 and 2,993,870. These isocyanuratecontaining foams have also low flame-resistivity, a long time of after-flame and high friability; for example, the aforementioned isocyanurate-containing foams have only 4 to 5 minutes of burn through time.

An object of the present invention is to provide a highly flame-resistant rigid plastic foam. A further object of the present invention is to provide a highly flame-resistant rigid plastic foam having low friability. A still further object of the present invention is to provide a highly flame-resistant rigid plastic foam by one shot technique. Other objects of the present invention will be obvious as described hereinafter.

The main essential feature of the present invention resides in the preparation of isocyanurate-containing polyurethane foam by using specific raw materials and specific reaction conditions, that is, the highly flame-resistant rigid plastic foam can be obtained by the combination of a specific polyisocyanate, specific equivalent ratio between reagents and specific weight ratio of aliphatic to aromatic components, and by use of conventional trimerization catalysts for isocyanate groups.

The polyisocyanates to be used in the present invention include aromatic polyisocyanates having no orthosubstituent and aralkylene polyisocyanates having no orthosubstituent. Some examples of the said aromatic polyisocyanates are diphenylmethane-4,4'-diisocyanate, 2,2'-dimethyl diphenylmethane-4,4,'-diisocyanate, triphenylmethane triisocyanate, biphenyl-4,4'-diisocyanate, m-phenylene diisocyanate, p-phenylene diisocyanate, 1-methylbenzene-3,5-diisocyanate, azobenzene-4,4'-diisocyanate, 1,5-naphthylene diisocyanate, 2-nitrobenzene-4,4'-diisocyanate, benzophenone-3,3'-diisocyanate, 4-nitrotriphenylmethane-4,4'-diisocyanate, fluorene-2,7-diisocyanate, anthraquinone-2,6-diisocyanate, diphenylsulfide-4,4,'-diisocyanate, diphenylsulfone-4,4'-diisocyanate, diphenylmethanesulfone-4,4'-diisocyanate, 2,2'-dimethyldiphenyl disulfide-5,5,'-diisocyanate, which is referred to as crude MDI or PAPI and is described in the book entitled "Polyurethane, Chemistry and Technology", Part II p. 861, by J. H. Saunders. These compounds are used above and as mixtures.

Some examples of the said aralkylene polyisocyanates are m-xylylene diisocyanate, p-xylylene diisocyanate and the like or their mixtures.

Polyfunctional, active hydrogen-containing compounds to be used in the present invention are polyether polyols and polyesters and the like or their mixtures capable of use for the preparation of conventional urethane foams or flexible, semi-rigid and rigid urethane foam. Examples for the preparation of the compounds are described in the books "Polyurethanes, Chemistry and Technology", Part I, pages 30–47, pages 349–351; Part II, pages 857–865, written by J. H. Saunders, and "Rigid Plastic Foams", pages 10 to 21, written by T. H. Ferrigno, Polyesters used for the preparation of conventional urethane foams, triglycerides such as caster oil having hydroxyl and/or carboxyl groups, dimer acids and the like, and mixtures thereof may be used in the present invention. Diol, triol, tetrol, pentol, hexol or octol type of polyether polyol capable of use for the preparation of conventional urethane foams may also be used in the present invention. Conventional polyether polyols for urethane foams are those having more than three hydroxy groups and a hydroxyl number of from 20 to 1000. Polyether polyols having a hydroxyl value in the range of 300 to 600, and the functionality of more than 3 are used preferably.

Foaming agents which are used for the preparation of conventional urethane foam may be used in the present invention. The foaming agents are non-reactive organic solvents, compounds generating a gaseous matter at heating them and reactive foaming agents and the like or their mixtures as described in the Ferrigno's book, pages 42–46. Some examples of the non-reactive organic solvents are chlorofluoroalkanes, such as dichlorodifluoromethane, monofluorotrichloromethane, trichlorotrifluoroethane, or n-pentane, n-hexane or 1,2-dichloroethane, tetrachloromethane and etc. Examples of said gas-generating compounds are diazoaminobenzene, azodiisobutyronitrile and azohexahydrobenzonitrile.

Some examples of the reactive foaming agents include water, nitroalkanes (as described in the Japanese Pat. No. 266,681), aldoximes (described in the Japanese Pat. No. 269,353), nitroureas (in the Japanese Pat. No. 272,128), acid amides (in the Japanese Pat No. 278,181), boric acid (in U.S. Pat. No. 3,078,240), acetyl acetone (in the Japanese Pat. No. 269,353) and etc.

Catalysts which are conventional for trimerization of isocyanate groups are used in the present invention. Some examples are described in literatures, such as J. R. Saunders, "Polyurethanes, Chemistry and Technology", Part I, pages 94–97 & 212, Beitchmann, B.D. Rubber Age, Feb. 1966, Beitchmann, B. D. I & EC Product Research and Development, Vol. 5, No. 1, pages 35–41, Mar. 1966, and Nicolas, L. and Gmitter, G. T. J. Cellular Plastics, Vol. 1, No. 1, pages 85–95 (1965).

Examples of catalysts are (a) organic strong base, (b) tertiary amine cocatalyst combination, (c) Friedel Crafts catalysts, (d) basic salts of organic weak acids, (e) alkali metal oxides, alkali metal alcoholates, alkali metal phenolates, alkali metal hydroxides and alkali metal carbonates, (f) onium compounds from nitrogen, phosphorous, arsenic, antimony, sulfur and selenium, (g) epoxides and (h) mono-substituted monocarbamic esters. Preferable catalysts are those which are soluble in components to be used and include, for example, polyether polyols, fluorocarbons and etc.

Examples of salt of organic strong base are trialkyl phosphines (J. Cellular Plastics mentioned above), trialkyl-aminoalkyl phenols (U.S. Pat. 2,993,870), 3- and/or 4-substituted pyridine (British Pat. 856,372) are also effective in the present invention.

Some examples of the combinations are triethylene diamine-propylene oxide, triethylene diamine-trioxymethylene, N,N,N',N'-tetramethyl 1,3-butane diamine-propylene oxide, pyridine-propylene oxide, N-methyl morphorine-propylene oxide, triethylene diamine-acetaldehyde, triethyleneimine-alkyleneimine or alkyleneimine adducts (I & EC. Res. and Dev. Vol. 5, No. 1, pages 35-41, 1966).

Examples of Friedel Crafts catalysts include $AlCl_3$, $FeCl_3$, $BF_3$ and $ZnCl_2$ (J. Cellular Plastics described above).

Examples of organic weak acids include (A) alkali metal salts of mono or dicarboxylic acids of aliphatic, aromatic, alycyclic or aralkyl acids which are described in British Pat. No. 809,809 and also (B) alkali metal salts of organic weak acids excluding carboxylic acids, for example, salts of benzensulfinic acid nitrophenols, picric acid, phthalimide, diethyl phosphite and etc.

Preferable salts for the preparation of the present invention are alkali metal salts of $C_6 - C_{20}$ carboxylic acid, especially potassium salts of the said carboxylic acid, such as potassium octoate or 2-ethyl hexoate, potassium benzoate, potassium oleate, potassium phthalimide, potassium diethyl phosphite.

Potassium salt is the most effective among lithium, sodium and potassium salts. The activity decreases in the order of potassium, sodium and lithium. Rubidium and cesium salts may also be used. Examples of common alkali metal oxides are potassium oxide, sodium oxide, and lithium oxide. Examples of alkali alcoholates are sodium methoxide, potassium ethoxide, and potassium alcoholates from ethylene glycol or polyether polyol.

Examples of alkali phenolates are sodium phenolate, sodium 2,4-dinitrophenolate, potassium 2,4,6-trinitrophenolate, sodium 2,4,6-trichlorophenolate and potassium 2,4-dichlorophenolate.

Examples of alkali hydroxides and carbonates are hydroxide and carbonate of lithium, sodium, potassium, rubidium and cesium respectively.

Examples of onium compounds from nitrogen, phosphorous, aresenic, antimony, sulfur and selenium are described in British Pat. No. 837,120, for example, tetraethyl ammonium hydroxide, benzyltriethylammonium hydroxide, tetraethylphosphonium hydroxide.

Examples of epoxides are described in J. Cellular Plastics, Vol. I, No. 1, page 85, 1965 and also U.S. Pat. Nos. 2,979,485 and 2,979,360.

Examples of mono-substituted monocarbamic ester are described in British Pat. No. 920,080. The catalysts hereinbefore described are usually used in a state of solution or dispersion. Suitable solvents are water, dimethyl formamide, dimethyl sulfoxide and etc. Polyether polyol and polyester may be also used as a solvent or a dispersion medium in the present invention.

Surfactants to be used to the present invention are surfactants for the preparation of conventional urethane foam. Some examples are a silicone surfactant and a nonionic surfactant. Some examples of the surfactants are described in the Ferrigno's book, pages 38 to 42 mentioned above.

The use of surfactant is not always necessary in the present invention, and in some cases a foam having good cell structure is obtaned. It is desirable in almost cases that the surfactant is used for aiming at fine cell structure and high thermal insulation property of the foam obtained.

Flame retardants to be used in the present invention are flame retardants for the preparation of conventional urethane foams.

Some examples are described in Ferrigno's book, pages 46 to 49 mentioned above, which are antimony oxide, halogen-containing phosphates, such as tris-chloroethyl phosphate and tris-dibromopropyl phosphate, and halogencontaining organic compounds, such as perchloropentacyclodecane, tetrachloronaphthalene, and phosphorous-containing polyesters or polyols, halogen-containing polyetherpolyols or polyesters.

The said flame-retardant may or may not be used in the present invention. The use of the flame-retardants, especially halogen-containing flame retardants are preferable to give the foam short time of after-flame and essentially after-flame is not observed.

A high flame-resistant foam can be obtained by using the specified raw materials described above, and by using the specific conditions hereinafter described.

One of the specified conditions is the ratio between chemical equivalents of reactants, that is, the equivalent ratio indicated either by the formula $A_e/B_e+C_e+_hde$) or by the formula: $A_e/(B_e+C_e+D_e+E_e+F_e)$ must be more than 2.0, where A, B, C, D, E and F represent polyisocyanate, active hydrogen-containing compound, foaming agent, catalysts, surfactant and flame retardant respectively, and the suffix $e$ represents the number of chemical equivalent of the components. Preferably the equivalent ratio indicated by the just noted formulas is less than 100. In this case, the formula is applied only for the components to be reacted with the isocyanate. Therefore, when an inert component for the isocyanate is used, the component must be omitted in the calculation of the equivalent ratio in the formula. The latter formula is used when one or both of the components E and F are employed in the presence of the components A, B, C and D. Some examples of the inert components are flame retardants such as tris-chloroethyl phosphate.

The specific condition is a necessary one to give excellent flame resistivity to the foam by the formation of isocyanurate-rich structure, but the isocyanuraterich structure above is not a sufficient condition for obtaining the final product. Another necessary condition to give the foam excellent flame-resistivity is the weight ratio shown by the formula: $0.5 > B_w/A_w > O$, where w represents the weight of the component respectively. If the weight ratio is more than 0.5, flame resistivity of the foam decreases markedly, even if the equivalent ratio is kept in the said limitation. More preferably, the weight ratio $B_w/A_w$ is less than 0.4 and greater than 0.001.

Therefore, the said two specified conditions must be kept in the present invention.

Foaming techniques to be used in the present invention are analogous to those of conventional urethane foams, for instance, one shot system, quasi-prepolymer system and prepolymer system may be used respectively. In practice, one shot system is the most economical and convenient. Spray application is also possible. Furthermore, both techniques of frothing and non-frothing can be used as in the conventional urethane foam preparation.

A variety of products can be obtained by the present invention, for example, slab stock, molded product, foamed-in-place product, and sprayed product by any of the techniques described above.

Merits of the foams obtained by the present invention are as follows: a) Markedly high resistivity to flame. The property is actually proved by a flame-penetration test used by the Bureau of Mines (U.S.A.). Test results are shown in the following Table.

| Name of sample | Burn through time (sec) |
| --- | --- |
| A foam prepared by this invention | 3600 |
| A foam prepared by J. Cell. Plast. cited above | 150 |
| Rigid urethane foam (non-burning grade *) | 120 |
| Rigid urethane foam (self-extinguishing grade *) | 25 |
| Rigid urethane foam (burning grade *) | 10 |
| Polyvinyl chloride foam | 600 |
| Foamed polystyrene | 3 |
| Phenolic foam | 133 |
| Glass fiber | 15 |

* by ASTM D 1692 - 59T.

b. Essentially no flame propagation. A proof is made by ASTM D 635 – 56T which is more severe than ASTM D 1692. The test results are shown in the following Table.

| Name of sample | Time of after-flame (sec) |
| --- | --- |
| A foam prepared by the present invention | zero |
| Non-burning foam by ASTM D 1692 | 4 – 6 |
| Self-extinguishing foam by ASTM D 1692 | burning is continued | c. Excellent dimensional stability. Heat distortion or crack formation was not observed at a test conducted by heating a test sample at 150°C for two weeks, and only two per cent of dimensional change was observed in the test. On the contrary, conventional urethane foams show remarkable deformation and crack formation at the same condition.

d. Less friability. Heretofore known polyisocyanuratecontaining foam, such as a foam obtained by Nicholas & Gmitter's literature mentioned above, is too friable to use.

The foams obtained by the present invention have potential uses, such as cold insulation, high temperature insulation and etc. Some examples include building panel core, chemical plant insulation, insulation in ship insulation, heavy oil pipe insulation. The foams can also be used in the high temperature insulation in place of foamed class.

EXAMPLE 1

Potassium octoate containing 4% of water was used as a catalyst, which is soluble in polyether polyols. 94 g of sorbitol based-polyether polyol having a hydroxyl value of 490, 8.5 g of the potassium octoate, 120 g of trischloroethyl phosphate, 5 g of silicone surfactant, and 90 g of trichloromonofluoromethane were mixed to make a solution. 630 g of crude (4,4-diphenylmethane diisocyanate, was mixed, and after a vigorous stirring in a mechanical mixer for ten minutes a foam was obtained. The resultant foam had cream time: 15 sec., rise time : 120 sec., foam density : 0.041 g/ml, tensile strength in the direction of foam rise : 2.0 kg/cm$^2$, closed cell % : 90, thermal conductivity : 0.015 kcal/mh°C (10°C), the equivalent ratio: 5.0, the weight ratio : 0.15.

EXAMPLE 2

Frothing technique was carried out by using an Admiral Foaming Machine. Foaming conditions were 5.9 kg/min. of our put, ambient temperature 17°C of and panel size was 60×90×100 (cm).

Foaming solution was made as follows: 96 parts of sucrose based-polyether polyol (hydroxyl value 460), 60 parts of trichloromonofluoromethane, 120 parts of trischloroethyl phosphate, 20 parts of silicone surfactant, Dc 113, 11 parts of potassium octoate dissolved in 11 parts of the said polyether polyol were mixed homogeneously to make a solution. Frothing is conducted by the co-use of dichlorodifluoromethane, in which the mixing ratio was 2.2 parts of crude MDI per 1.0 part of the said solution. The equivalent ratio and weight ratio were 5.6 and 0.14 respectively. Frothed foam was poured in a panel of 100 mm in thickness. Physical properties of the foam were as follows: Overall density : 0.047 g./cm.3, core density : 0.042 g./cm.3, compressive strength in the direction of foam rise : 2.2 kg/cm$^2$, compressive strength, in the direction of perpendicular to foam rise 1.6 kg/cm$^2$, closed cell per cent : 93.8, thermal conductivity: 0.015 kcal/mh°C (10°C).

EXAMPLE 3

Mechanical mixing was carried out by using a drill mixer and by using 87 g of phosphorous-containing polyether polyol having a hydroxyl value of 490, 10 g. of potassium octoate, 120 g of trischloroethyl phosphate, 5 g of silicone surfactant, 110 g of trichloromonofluoromethane and 630 g of crude MDI.

Cream time, rise time, foam density, equivalent ratio and weight ratio were 15 sec., 110 sec., 0.037 g/ml, 5.4 and 0.14 respectively.

EXAMPLE 4

140 g of sorbitol based-polyether polyol mentioned above, 12 g of sodium benzoate, 120 g of trisbromoethyl phosphate, 10 g of silicone surfactant, DC 113, 80 g of trichloromonofluoromethane were mixed to make a solution, to which 630 g of crude MDI was added and stirred as described above.

Cream time, rise time, foam density, equivalent ratio and weight ratio were 30 sec., 135 sec., 0.051 g/ml, 3.7 and 0.22 respectively.

EXAMPLE 5

Foaming was carried out by the same procedure as described in Example 1, and by using 10 g of cadmium naphthenate, 80 g of trichloromonofluoromethane, 140 g of sorbitol basedpolyester polyol mentioned above, 120 g of trisdibromopropyl phosphate, 10 g of silicone surfactant, DC 113, and 630 g of crude MDI.

The cream time, rise time, foam density, equivalent ratio and weight ratio were 20 sec., 55 sec., 0.072 g/ml, 3.7 and 0.22 respectively.

EXAMPLE 6

Foaming was carried out according to the same procedure and raw materials as described in Example 5, except the use of 8 g of potassium oleate instead of 10 g of cadmium naphthenate.

EXAMPLE 7

Foaming was carried out according to the same procedure as described in Example 1 and by using 22 g of nitroethane, 25 g of sorbitol based-polyether polyol mentioned above, 15 g of potassium octoate, 100 g of trischlorethyl phosphate, 20 g of silicone surfactant and 630 g of crude MDI.

Cream time, rise time and foam density were 3 sec., 160 sec. and 0.041 g/ml respectively. The equivalent ratio was 4.8 and the weight ratio was 0.040.

EXAMPLE 8

Foaming was carried out according to the same procedure as described in Example 1, and by using 20 g of dimethyl sulfoxide solution containing 30% boric acid, 55 g of sorbitol based-polyether, 20 g of silicone surfactant, 40 g of trichloromonofluoromethane, 15 g of potassium octoate and 630 g of crude MDI.

Foam density, the equivalent ratio and the weight ratio were 0.042 g/ml, 5.0 and 0.087 respectively.

EXAMPLE 9

Foaming was carried out according to the same procedure as described in Example 1 and by using 720 g of PAPI, 62 g of sucrose based-polyether polyol mentioned above, 120 g of trisdibromopropyl phosphate, 20 g of silicone surfactant, 80 g of trichloromonofluoromethane and 15 g of potassium octoate.

Cream time, rise and foam density were 20 sec., 160 sec. and 0.049 g/ml respectively. The equivalent ratio was 6.6, and the weight ratio was 0.094.

EXAMPLE 10

Foaming was carried out according to the same procedure as described in Example 1 and raw material except 1.5 g of triethylene diamine was used.

Cream time, rise time and foam density were 13 sec., 80 sec. and 0.038 g/ml.

The same results were obtained by using the above-mentioned procedure except the use of N-methyl morphorine or stannous octoate instead of triethylene diamine.

EXAMPLE 11

Foaming was carried out according to the same procedure as described in Example 1, and by using 39 g of sorbitol based-polyether polyol mentioned above, 12 g of potassium octoate, 10 g of silicone surfactant, DC 113, 96 g of trichloromonofluoromethane and 685 g of crude MDI.

Rise time and foam density were 160 sec. and 0.037 g/ml respectively.

EXAMPLE 12

Foaming was carried out according to Example 1, and by using 77 g of phosphorous-containing polyether polyol, HF 490 (Sanyo Chemical Co.), 16 g of potassium octoate, 10 g of silicone surfactant L530 (U.C.C.), 90 g of trichloromonofluoromethane and 610 g of crude MDI.

Foam denisty, the equivalent ratio and the weight ratio were 0.040 g/ml, 5.5 and 0.13 respectively.

EXAMPLE 13

Foaming was carried out according to the same procedure as described in Example 1, and by using 127 g of sorbitol based-polyether polyol mentioned above, 7 g of potassium octoate, 120 g of trischloroethyl phosphate, 20 g of silicone surfactant and 600 g of crude MDI.

The rise time, the equivalent ratio and the weight ratio were 150 sec., 3.1 and 0.20 respectively.

EXAMPLE 14

The same result was obtained by the same procedure and raw materials as described in Example 13, except the use of 50 g of antimony oxide instead of 120 g of trischloroethyl phosphate.

EXAMPLE 15

The same result was obtained by the same procedure and raw materials as in Example 13, except the use of 80 g of 2,4,6-tris(dimethylaminoethyl) phenol instead of 7 g of potassium octoate, and 100 g of perchloropentacyclodecane instead of trischloroethyl phosphate.

EXAMPLE 16

Foaming was carried out according to the same procedure as described in Example 1, and by using 130 g of polylite 8605 (a commercial named polyester for rigid urethane foam, Reichhold C.) 5 g of potassium octoate, 120 g of trischloroethyl phosphate, 75 g of trichloromonofluoromethane and 630 g of crude MDI.

Foam density, the equivalent ratio and the weight ratio were 0.060 g/ml, 4.8 and 0.21 respectively.

EXAMPLE 17

Foaming was carried out according to the same procedure as described in Example 1, and by using 26 g of polylite 8605, a polyester having a hydroxyl value of 400 3 g of triethylenediamine, 30 g of epoxy resin having a molecular weight of 390, 32 g of trischloroethyl phosphate, 4 g of silicone surfactant, 40 g of trichloromonofluoromethane and 250 g of PAPI.

Foam density, cream time and rise time were 0.055 g/ml, 20 sec. and 300 sec. respectively. The equivalent ratio was 10.4 and the weight ratio was 0.10.

EXAMPLE 18

Foaming was carried out according to the same procedure as described in Example 1, and by using 6 g of sodium benzoate, 90 g of the polyester used in Example 17, 16 g of trischloroethyl phosphate, 40 g of trichloromonofluoromethane, 250 g of crude MDI.

Foam density, cream time and rise time were 0.061 g/ml, 25 sec. and 300 sec. respectively. The equivalent ratio was 2.8 and the weight ratio was 0.36.

EXAMPLE 19

Foaming was carried out according to the same procedure as described in Example 1, and by using 44 g of the polyester used in Example 17, 4 g of potassium octoate, 4 g of silicone surfactant, 2 g of water and 250 g of crude MDI.

Foam density, cream time and rise time were 0.10, 25 sec. and 360 sec. respectively. The equivalent ratio was 3.3 and the weight ratio was 0.17.

EXAMPLE 20

Foaming was carried out according to the same procedure as described in Example 1, and by using 40 g of the polyester used in Example 17, 15 g of 2,4,6-tris(-dimethylamino-methyl) phenol, 20 g of trischloroethyl phosphate, 4 g of nitroethane, 4 g of silicone surfactant DC 113, and 250 g of crude MDI.

Cream time, rise time, and foam density were 10 sec., 140 sec. and 0.20 g/ml. The equivalent ratio was 4.2 and the weight ratio was 0.16.

EXAMPLE 21

Foaming was carried out according to the same procedure as described in Example 1, and by using 92 g of a polyester having a hydroxyl value of 56, 5 g of potassium octoate, 40 g of trichloroethyl phosphate, 30 g of trichloromonofluoromethane, 4 g of silicon surfactant, and 250 g of crude MDI.

Cream time, rise time and foam density were 12 sec., 85 sec. and 0.060 g/ml. The equivalent ratio was 12.5 and the weight ratio was 0.37.

EXAMPLE 22

A chlorine-containing polyester was prepared by reacting 2 moles of 3,6-endodichloromethylene tetrachlorophthalic acid anhydride, 1 mole of adipic acid and 5 mole of propylene glycol. The polyester has 1.0 of acid value and 350 of hydroxyl value. Foaming was carried out by the same procedure as described in Example 21, and by using 30 g of the polyester, 5 g of potassium octoate, 40 g of trichloroethyl phosphate, 44 g of trichloromonofluoromethane, 0.4 g of silicone surfactant, and 250 g of crude MDI.

Cream time, rise time and foam density were 12 sec., 180 sec. and 0.057 g/ml. The equivalent ratio was 7.9 and the weight ratio was 0.12.

EXAMPLE 23

A polyester which was prepared by reacting dimer acid and glycerine and having a hydroxyl value of 5 and an acid value of 150, and 80 g of said polyester, 2,4 g of triethylenediamine, 24 g of epoxy resin having a molecular weight of 390, 4 g of silicone surfactant L 530, 40 g of trichloromonofluoromethane, 40 g of tris (chloroethyl) phosphate and 250 g of crude MDI were used.

Cream time, rise time and foam density were 20 sec., 180 sec. and 0.070 g/ml. The equivalent ratio was 8.4 and the weight ratio was 0.32.

EXAMPLE 24

A prepolymer having an isocyanate content of 30.6% was prepared by using 98.43 parts of crude MDI and 1.57 parts of the polyester used in Example 16. 254 g of said prepolymer, 40 g of trichloroethyl phosphate, 40 g of trichloromonofluoromethane and 4 g of potassium octoate were used.

Rise time and foam density were 80 sec. and 0.045 g/ml respectively. The equivalent ratio and the weight ratio were 41.0 and 0.016 respectively.

EXAMPLE 25

Foaming was carried out according to the same procedure as described in Example 1 at 40°C, and by using 24 g of tris(chloroethyl) phosphate, 2 g of silicone surfactant, 16 g of sorbitol based-polyether polyol mentioned above, 0.5 g of potassium octoate, 22 g of trichloromonofluoromethane and 89 g of xylylene diisocyanate. The equivalent ratio was 5.3 and the weight ratio was 0.18. Rise time and foam density were 30 sec. and 0.035 g/ml.

EXAMPLE 26

Foaming was carried out by using the same procedure and raw materials as described in Example 25, except the use of 118 g of pure MDI instead of xylylene diisocyanate, Rise time and foam density were 100 sec. and 0.038 g/ml respectively.

EXAMPLE 27

Foaming was carried out according to the procedure as described in Example 25, and by using 76 g of m-phenylene diisocyanate instead of xylylene diisocyanate and 0.7 g of potassium octoate instead of 1.5 g of the same.

Rise time and foam density were 35 sec. and 0.040 g/ml respectively. The equivalent ratio was 5.9 and the weight ratio was 0.22.

EXAMPLE 28

Foaming was carried out by the same procedure as described in Example 1, and by using 120 g of glycerine based-polyether (molecular weight : 3000, hydroxyl value : 56), 120g of trischloroethyl phosphate, 20 g of silicone surfactant L 530, 7 g of potassium octoate, 120 g of trichloromonofluoromethane and 600 g of crude MDI. The equivalent ratio was 22 and the weight ratio was 0.20.

Rise time and foam density were 120 sec. and 0.046 g/ml respectively.

The same result was obtained by using the same amount of ethylene glycol based-polyether having a molecular weight of 2000 and hydroxyl value of 56 instead of the said polyether.

EXAMPLE 29

Foaming was carried out by the same procedure as described in Example 1, and by using 154 g of dimer acid (Versamide 240, under the trade name of Emery Industries Inc.), 112 g of trischloroethyl phosphate, 28 g of silicone surfactant, 17 g of potassium octoate, 105 g of trichloromonofluoromethane and 620 g of crude MDI. The equivalent ratio and the weight ratio were 6.4 and 0.25 respectively.

Rise time and foam density were 26 min. and 0.031 g/ml respectively.

EXAMPLE 30

Foaming was carried out by the same procedure as described in Example 1, and by using 2.5 g of potassium hydroxide, 104 g of sorbitol based-polyether, 20 g of silicone surfactant, 120 g of trischloroethyl phosphate, 110 g of trichloromonofluoromethane and 605 g of crude MDI. The equivalent ratio was 4.7 and the weight ratio was 0.17.

Rise time and foam density were 45 sec. and 0.041 g/ml respectively.

EXAMPLE 31

Foaming was carried out by the same procedure as described in Example 1, and by using 2 g of potassium acetate, 2 g of water, 40 g of trischloroethyl phosphate, 4 g of silicone surfactant, 30 g of sorbitol based-polyether polyol mentioned above and 250 g of crude MDI. The equivalent ratio was 3.7 and the weight ratio was 0.12.

Rise time end foam density were 140 sec. and 0.081 g/ml respectively.

EXAMPLE 32

Foaming was carried out by the same procedure as described in Example 1, and by using 110 g of trichlorotrifluoroethane, 8 g of potassium octoate, 82 g of sorbitol based-polyether mentioned above, 20 g of silicone surfactant L 530, 120 g of trischloroethyl phosphate and 610 g of crude MDI. The equivalent ratio was 5.6 and the weight ratio was 0.13.

Rise time and foam density were 135 sec. and 0.051 g/ml respectively.

EXAMPLE 33

Foaming was carried out by the same procedure as described in Example 1, and by using 30 of trischloroethyl phosphate, 5 g of silicon surfactant L 530, 1.6 g of sorbitol based-polyether mentioned above, 2 g of triethylenediamine and 15 g of an epoxy resin having a molecular weight of 390, 15 g of trichloromonofluoromethane and 157 g of crude MDI. The equivalent ratio was 84 and the weight ratio was 0.01.

Rise time was 10 min. and foam density was 0.044 g/ml.

What we claim is:

1. A method for the preparation of a rigid, highly flame resistant polyurethane-modified polyisocyanurate foam which comprises reacting
   A. at least one aromatic polyisocyanate having no orthosubstituent and having a plurality of aromatic nuclei in the molecule,
   B. at least one polyether polyol containing more than 3 hydroxy groups and having an equivalent weight of at least 114,
   C. at least one foaming agent useful for the preparation of polyurethane foam,
   D. at least one catalyst useful for the trimerization of the isocyanate group,
   E. at least one surfactant and
   F. at least one flame retardant useful for the preparation of polyurethane foam, the proportion of said components A, B, C, D, E and F being such as to satisfy the relationships of
   1. the equivalent ratio defined by the expression, $Ae/(Be + Ce + De + Ee + Fe) > 2$, and
   2. the weight ratio defined by the expression, $0.22 \geq Bw/Aw \geq 0.04$ wherein A, B, C, D, E and F represent said components respectively, $e$ represents the number of chemical equivalents of said components, and $w$ represents the weight of said components and wherein any one of components C, D, E and F is nonreactive with the component A, the non-reactive component is eliminated from the relationship.

2. The flame-resistant, rigid polyurethane-modified polyisocyanurate foam prepared in accordance with the method of claim 1.

3. The method according to claim 1 in which said polyisocyanate is selected from a member of the group consisting of diphenylmethane-4, 4'-diisocyanate and polyphenyl polymethylene polyisocyanate.

4. The method for the preparation of a rigid plastic foam as claimed in claim 1 in which said method is carried out by a one shot process.

5. A method according to claim 1 in which said polyisocyanate is selected from a member of the group consisting of diphenylmethane-4,4'-diisocyanate and polyphenyl polymethylene polyisocyanate and said equivalent ratio is not more than about 6.6.

* * * * *